United States Patent
Vega et al.

(10) Patent No.: US 10,068,457 B2
(45) Date of Patent: *Sep. 4, 2018

(54) LEASH NOTIFICATION FOR TRACKING DEVICE

(71) Applicant: Tile, Inc., San Mateo, CA (US)

(72) Inventors: Jose Pons Vega, Belmont, CA (US); Marco Ancheta, San Jose, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,414

(22) Filed: May 10, 2017

(65) Prior Publication Data

US 2017/0243469 A1    Aug. 24, 2017

Related U.S. Application Data

(63) Continuation of application No. 15/348,807, filed on Nov. 10, 2016, now Pat. No. 9,685,066, which is a continuation of application No. 14/937,886, filed on Nov. 11, 2015, now Pat. No. 9,525,971.

(51) Int. Cl.
| | |
|---|---|
| *G08B 21/24* | (2006.01) |
| *G01S 1/68* | (2006.01) |
| *G01S 19/42* | (2010.01) |
| *G08B 7/06* | (2006.01) |
| *H04W 24/08* | (2009.01) |
| *H04W 4/02* | (2018.01) |

(52) U.S. Cl.
CPC ............... *G08B 21/24* (2013.01); *G01S 1/68* (2013.01); *G01S 19/42* (2013.01); *G08B 7/06* (2013.01); *H04W 4/02* (2013.01); *H04W 24/08* (2013.01); *H04M 2250/10* (2013.01)

(58) Field of Classification Search
CPC ....... H04W 4/02; H04W 4/021; H04W 4/022; H04W 4/023; H04W 4/025; H04W 4/04; H04W 24/08; G01S 1/00; G01S 1/02; G01S 1/024; G01S 1/08; G01S 1/68; G01S 1/76; G01S 3/00; G01S 7/00; G01S 19/42; G08B 21/24; G08B 7/06; H04M 2250/10
USPC .................... 340/539.1–539.32, 572.1, 10.1
See application file for complete search history.

(56) References Cited

U.S. PATENT DOCUMENTS

| | | | | |
|---|---|---|---|---|
| 2002/0190861 A1* | 12/2002 | Wentworth | ........ | G08B 21/0216 340/568.1 |
| 2005/0280546 A1* | 12/2005 | Ganley | .............. | G08B 13/1427 340/573.4 |
| 2013/0234853 A1* | 9/2013 | H. Kazerouni | .... | G08B 13/1427 340/572.1 |

* cited by examiner

*Primary Examiner* — Brian Wilson
(74) *Attorney, Agent, or Firm* — Fenwick & West LLP

(57) ABSTRACT

The communication between a tracking device and a secondary device that tracks the tracking device can be severed. On detecting a loss of connection, the secondary device retrieves a last known location of the tracking device from the tracking server. On receiving the last known location, the secondary device activates location detection functionality to determine a current location of the secondary device. If the current location is further than a predetermined threshold distance from the last known location of the tracking device, a notification is displayed by the secondary device indicating that the connection to the tracking device is lost. If the secondary device is within the predetermined threshold distance from the tracking device's last known location, the secondary device waits for a predetermined interval of time to elapse, and if the tracking device is not detected during this interval, a notification is displayed by the secondary device.

18 Claims, 6 Drawing Sheets

LEASH NOTIFICATION FOR TRACKING DEVICE

CROSS REFERENCE TO RELATED APPLICATIONS

This application is a continuation of U.S. application Ser. No. 15/348,807, filed Nov. 10, 2016, now U.S. Pat. No. 9,685,066, which application is a continuation of U.S. application Ser. No. 14/937,886, filed Nov. 11, 2015, now U.S. Pat. No. 9,525,971, which is incorporated by reference in its entirety.

BACKGROUND

This disclosure relates generally to tracking devices, and more specifically, to alerting a user of a potential loss of a tracking device.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object (e.g., if it becomes lost).

However, traditional tracking devices and corresponding systems suffer from one or more disadvantages. For example, traditional tracking devices do not detect if a tracking device is out of range from the location of a user, thus indicating that the user has lost the tracking device. Further, the battery life of a tracking device is often limited, resulting in an inability to leash a tracking device to a mobile device, thus limiting the usefulness of such tracking devices.

SUMMARY

An object that is attached to a tracking device can be prevented from being lost by leashing the tracking device to a secondary device. As used herein, a "leash" or being "leashed" refers to a connection between a tracking device and a secondary device such that when one or more conditions are satisfied (such as a greater than threshold distance between the tracking device and the second device, a greater than threshold time elapsing without the secondary device receiving a communication from the tracking device, and the like), a notification is emitted from or displayed on the secondary device, notifying a user of the tracking device or secondary device that the tracking device may be lost or left behind.

A tracking device can securely communicate with a secondary device, such as a mobile phone or computer, using a one-way communication protocol. For instance, the tracking device can generate a beacon signal that includes the identity of the tracking device, a key stored by the tracking device, a time interval during which the hash value is generated, or any other tracking device parameters. The tracking device can output the generated beacon signal, for instance as a Bluetooth-format advertisement or broadcast.

The secondary device can receive the beacon signal, and attempts to decode the beacon signal to determine the identity of the tracking device and a location of the tracking device (such as a location of the mobile device if the mobile device is within a threshold proximity of the tracking device), and can provide the identity of the tracking device and the determined location to a tracking server (such as a cloud server).

The tracking device can emit a location request either in response to the detection of movement by the tracking device, at a fixed interval, or in response to a request from a secondary device. The tracking device can include a time stamp within the location request indicating a time associated with the last detected movement of the tracking device. If the secondary device receives a location request with an indication that the tracking device has not moved since a high-accuracy location has been associated with the tracking device, the secondary device maintains the high-accuracy location with the tracking device, regardless of whether the secondary device has moved relative to the tracking device.

In case of a loss of communication between the tracking device and the secondary device, a leash is activated on the secondary device. Upon activation of leash, the secondary device retrieves a last known location of the tracking device from a tracking server and waits for a specific period of time to receive a communication from the tracking device (such as an advertisement packet that includes tracking device parameters associated with the tracking device). Examples of tracking device parameters include a key stored by the tracking device, a time interval during which the beacon signal is generated, a signal strength of the tracking device and other such parameters. If a communication is not received within a specific time period, location services are activated on the secondary device. The location service determines a location of the secondary device and calculates the distance of the current location of the secondary device from the last known location of the tracking device. If the last known location of the tracking device is more than a predetermined threshold distance away from the secondary device, a leash is triggered. If the last known location of the tracking device less than a predetermined threshold distance away from the secondary device, the secondary device will wait for a predetermined time interval to trigger a leash. Once the predetermined time interval has elapsed, if a communication from the tracking device still has not been received by the secondary device, a leash is triggered.

Upon the triggering of a leash, the secondary device is notified that the tracking device has been disconnected from the secondary device. The notification can be sent in the form of a message, push notification, vibration of the secondary device or any other such method.

Figure 1:
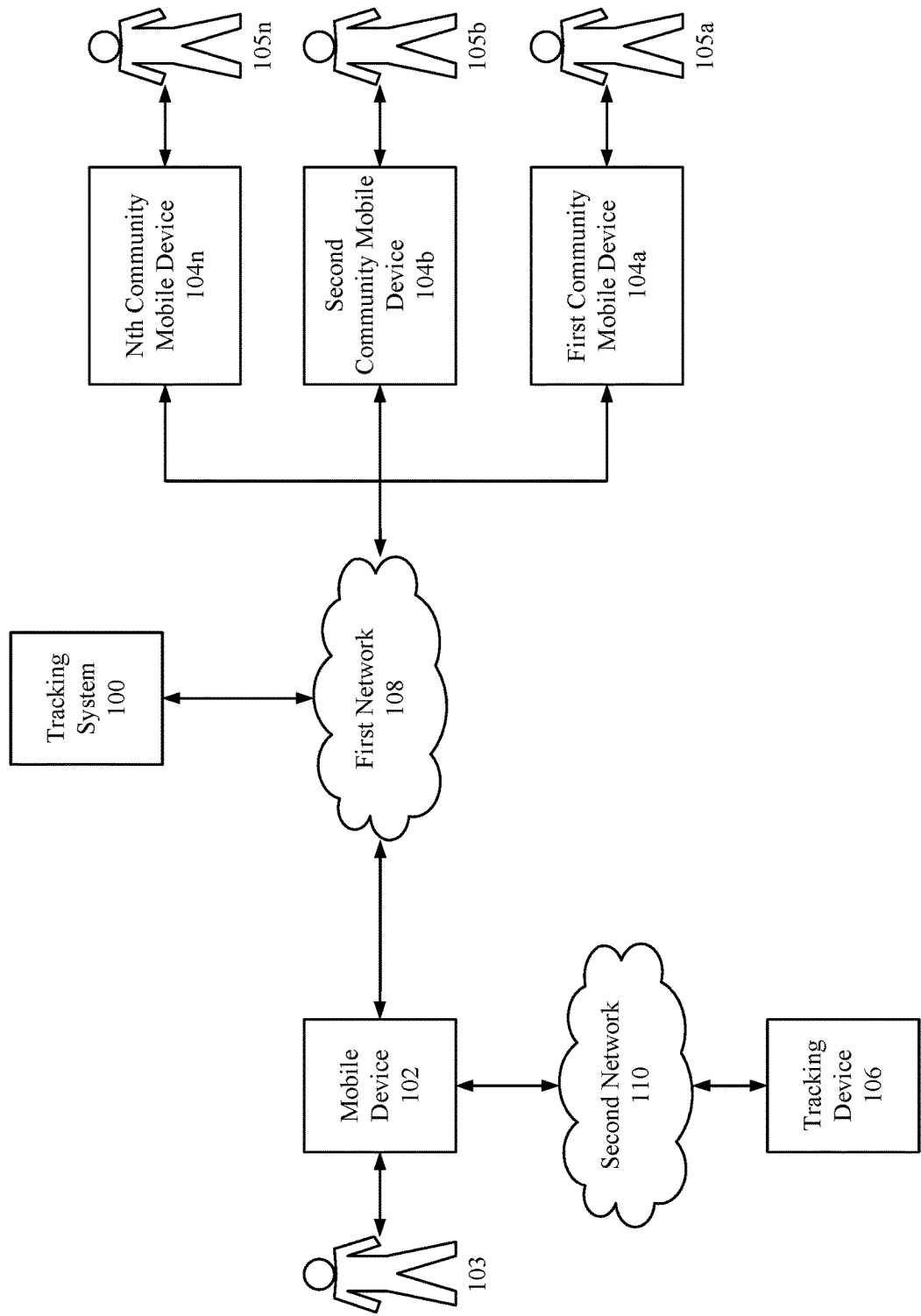
FIG. 1 illustrates a tracking device environment according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments described herein provide a user with the ability to prevent loss of one or more low-power tracking devices by leveraging the capabilities of a plurality of mobile devices associated with a community of users (e.g., users of the same tracking device system) in a secure and privacy-focused environment.

A user can attach a tracking device to or enclose the tracking device within an object, such as a wallet, keys, a car, a bike, a pet, or any other object that the user wants to track. The user can then use a mobile device (e.g., by way of a software application installed on the mobile device) to prevent loss of the tracking device and corresponding object by leashing the tracking device to the mobile device. For example, the mobile device can be alerted if a tracking device attached to an object is disconnected for a specified amount of time from the tracking device or if the mobile device is at a distance beyond the predefined distance threshold.

A location of the tracking device is determined by a mobile device coupled to the tracking device via a communication channel such as Bluetooth. The location of the tracking device is periodically updated by the mobile device. In an example embodiment, the mobile software application periodically receives "ping" packets from the tracking device via the Bluetooth communication channel. In a situation where the mobile device stops receiving the "ping" packets, it is possible that the Bluetooth communication channel is lost, indicating that the user may have accidentally forgotten the object with the tracking device. In such instances, a leash can be established between the tracking device and the mobile device in order to notify the user that the tracking device may have been forgotten or left behind.

A leash is established between the tracking device and the mobile device over two phases. The first phase is referred to herein as "activating a leash". A leash is activated when the mobile device detects that it may have lost the connection to the tracking device. For example, the mobile device may not receive the advertisement packets or other communications from the tracking device for more than a predetermined threshold wait time interval. In such instances, the mobile device marks the connection to the tracking device as lost, and activates a leash. The activation of a leash may include setting a flag indicating that a leash is activated between the tracking device and mobile device.

The second phase is referred to herein as "triggering a leash". Once the leash is activated on the mobile device and a determination is made that the connection is lost between the mobile device and tracking device, a leash is triggered. Triggering a leash refers to sending a notification to the mobile device that the tracking device may be lost or left behind, such that the user can see the notification and act upon it. In such situations, the mobile device triggers a leash notification that notifies the user of the missing tracking device. In most cases, the leash is triggered when the user is at a specific distance from the tracking device (e.g. 15 m from the tracking device) for a specific amount of time (e.g. 4 minutes or more). This prevents the false triggering of leash, in case the user is still nearby the tracking device, for example, in the backyard of the user's home.

However, in situations where the user is still in the predefined distance threshold and in the specified amount of time, but has lost the connection to the tracking device, the principles described herein allow the user to leverage the capabilities of a community of users to determine the location of the tracking device via a tracking system.

In particular, a tracking system (also referred to herein as a "cloud server" or simply "server") can maintain user profiles associated with a plurality of users of the system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate and track down the tracking device.

When a leash is activated on a tracking device, the mobile device sends a request to the tracking system to obtain a last known location of the tracking device. If a user from the community of users has updated the location of the tracking device to the tracking system, the mobile device can receive the updated location from the tracking system. The leash on the tracking device is de-activated and the user is notified of the location of the tracking device that was retrieved from the tracking system.

In addition to utilizing a general community of users, a user of the tracking system may desire to utilize the tracking capabilities of a specific group of one or more known users (e.g., friends or family of the user). For example, a user may indicate one or more friends or other users with which a tracking device may be shared. Sharing the tracking device may provide the ability for a friend to quickly determine if a tracking device is close-by without also querying a larger community of users, or to enable a friend to contact a user directly with information about the location of a tracking device.

Environment Overview

FIG. 1 illustrates an example implementation in which a tracking system 100 is communicatively coupled to a mobile device 102 associated with the user 103 and a plurality of community mobile devices 104a through 104n (collectively referred to herein as "community mobile devices 104") associated with a plurality of users 105a through 105n of the tracking system 100 (collectively referred to herein as "community users 105"). As will be explained in more detail below, the tracking system 100 can allow the user 103 to manage and/or prevent loss of a tracking device 106 associated with the user 103, for instance by activating a leash on the tracking device. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. Accordingly, the mobile device 102 and community mobile devices 104 are only able to communicate with the tracking device 106 if they are within a close proximity to the tracking device. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106.

If the mobile device 102 is located beyond the immediate range of communication with the tracking device 106 (e.g., beyond the second network 110), the mobile device 102 can be configured to activate a leash to send an indication that a tracking device 106 is lost to the tracking system 100, and request assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with a corresponding community users 116. For example, an implementation may include a first community mobile device 112a associated with a first community user 116a, a second community mobile device 112b associated with a second community user 116b, and additional communication mobile devices associated with additional community users up to an nth community mobile device 112n associated with an nth community user 116n. The community mobile devices 112 may also include functionality that enables each community mobile device 112 to identify a tracking device 106 within a proximity of the community mobile device 112. In one example, a first community mobile device 112a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may constantly transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102. In some cases, the strength of signal or absence of a signal may be used to leash a tracking device to indicate that the tracking device 106 may be further away than a predefined threshold distance, thus helping prevent the loss of the tracking device.

System Overview

Figure 2:
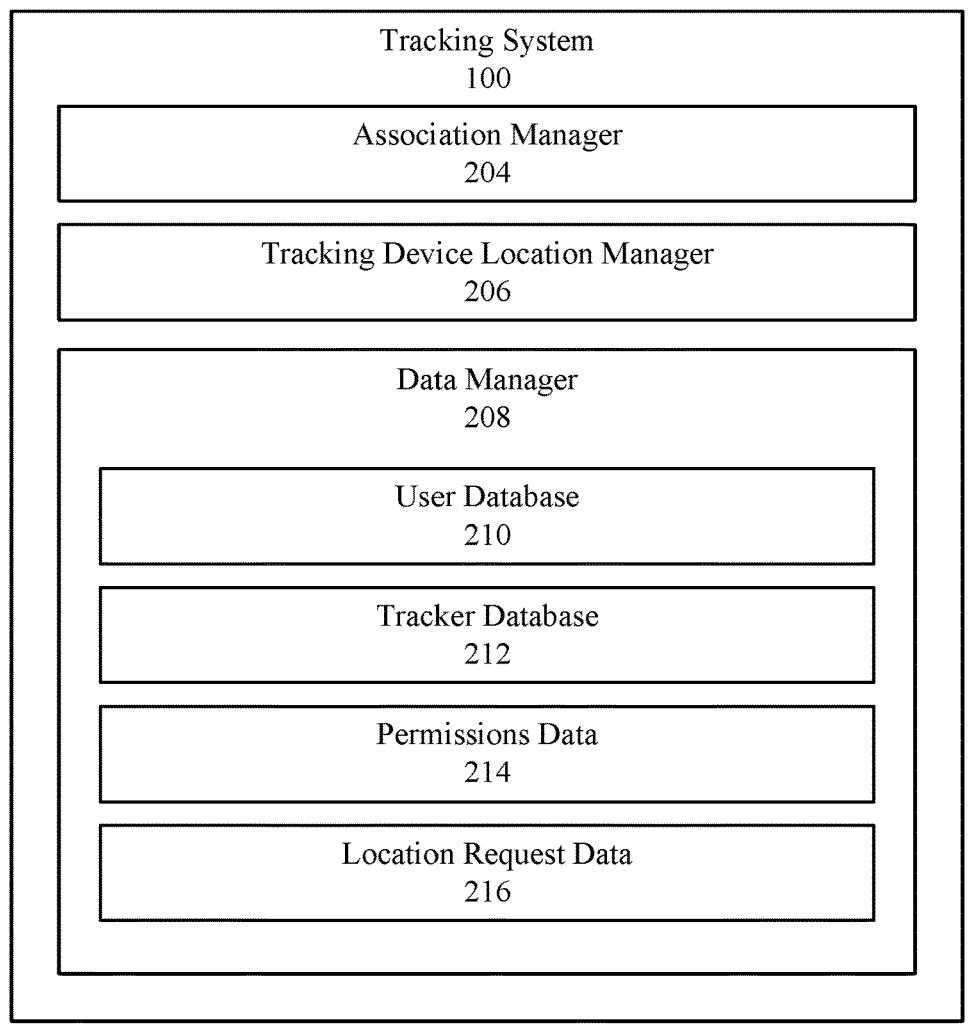
FIG. 2 illustrates an example tracking system of the implementation of FIG. 1.

FIG. 2 illustrates a diagram showing example components of the tracking system 100. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a location request from a mobile device 102 indicating that the tracking device 106 is leashed. The tracking device location manager 206 may set a flag on a database (e.g., tracker database 212) indicating that the tracking device 106 is leashed. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the leashed or unavailable tracking device 106.

The tracking device location manager 206 may also be used to receive and process a response to a tracking request that is received from one or more community mobile devices 104 that detect the tracking device 106 and respond to the tracking request. For example, the tracking system 100 may receive a response to the tracking request indicating a location within a proximity of the tracking device 106 and provide a last known location within a proximity of the tracking device 106 as provided by the community mobile device 104.

In one configuration, the tracking device location manager 206 may receive an indication that a tracking device 106 is leashed by the mobile device 102 and store the leashed indication on a database. When the tracking device location manager 206 receives an indication that the tracking device 106 is leashed, the tracking device location manager 206 may set a flag indicating that the tracking device 106 is leashed. Setting a flag for a tracking device 106 may include storing and/or associating a value associated with the tracking device that indicates that the tracking device 106 is leashed. This may include setting a flag, marker, digital value, or other indication that the tracking device 106 is leashed and maintaining or storing the indication of the leashed tracking device 106 on the tracking system 100 (e.g., on a database).

The tracking device location manager 206 may further manage providing indications about whether a tracking device 106 is lost or not lost. For example, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting a proximity of the tracking device 106. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking device location manager 206 may further receive updated locations from the community of mobile devices 104 that are constantly scanning for nearby tracking devices 106. On receiving updated locations, the tracking device location manager 206 may store the location information for the tracking device (e.g., on a database). In this example, the tracking device location manager 206 may receive a request for a location update of a leashed tracking device from the community of mobile devices 104 and, based on the stored information from the community of mobile devices 104, the tracking device location manager 206 may provide a response to the mobile device 102. The response to the leashed mobile device may be a last seen location of the tracking device that may be notified via a text message, push notification, ring tone, automated voice message, or other response for informing a user 103 that a location of the leashed tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate a tracking device 106 using an account and/or mobile device 102 associated with the user 103. Location request data 216 may include information related to a location request or a lost indication received from the user 103 via a mobile device 102.

Figure 3:
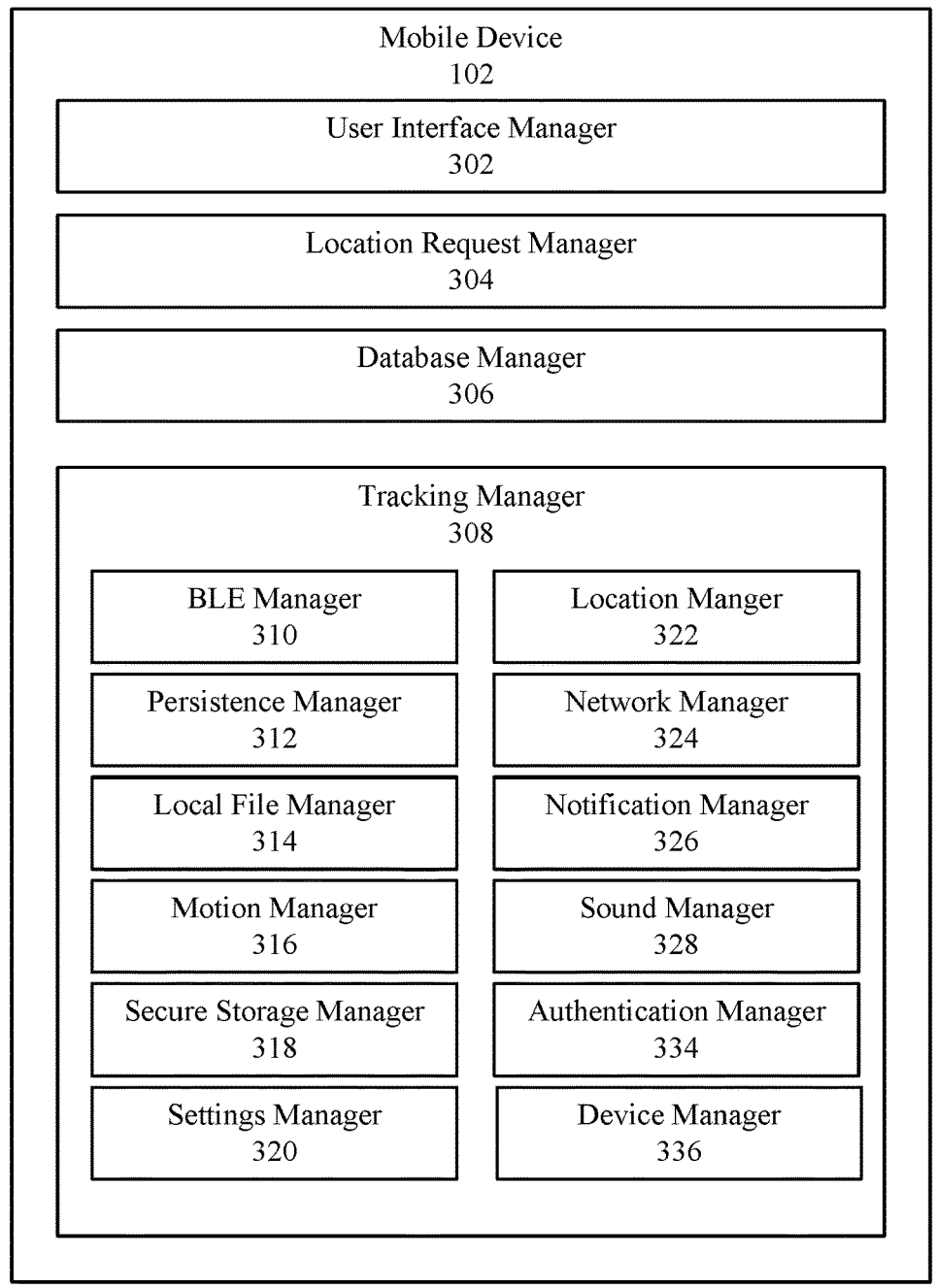
FIG. 3 illustrates an example user mobile device of the implementation of FIG. 1.

FIG. 3 illustrates a diagram showing example components of the mobile device 102. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. For example, a user may set the threshold distance for activating leash on a tracking device. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
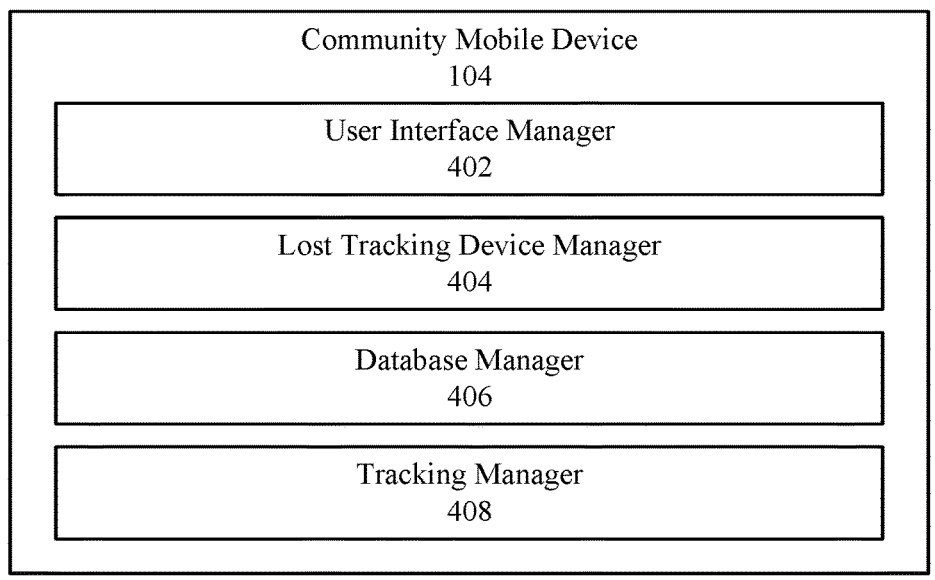
FIG. 4 illustrates an example community mobile device of the implementation of FIG. 1.

FIG. 4 illustrates a diagram showing example components of a community mobile device 104. As shown, the community mobile device 104 may include, but is not limited to, a user interface manager 402, a lost tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a lost tracking device manager 404. The lost tracking device manager 404 may facilitate scanning for nearby tracking devices 106. In some configurations, the lost tracking device manager 404 can continuously or periodically scan (e.g., once per second) for nearby tracking devices 106. The lost tracking device manager 404 may determine whether to provide an updated location of the nearby tracking device 106 to the tracking system 100. In some configurations, the lost tracking device manager 404 provides a location of a nearby tracking device 106 automatically. Alternatively, the lost tracking device manager 404 may determine whether the location of the tracking device 106 has been recently updated, and determine whether to provide an updated location based on the last time a location of the tracking device 106 has been updated (e.g., by the community mobile device 104). For example, where the community mobile device 104 has provided a recent update of the location of a tracking device 106, the lost tracking device manager 404 may decide to wait a predetermined period of time (e.g., 5 minutes) before providing an updated location of the same tracking device 106.

In one configuration, the lost tracking device manager 404 may receive and process a location request or other information relayed to the community mobile device 104 by the tracking system 100. For example, the lost tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within the proximity of the community mobile device 104. Therefore, where a tracking device 106 that matches information provided by the tracking system 100 (e.g., from the location request) comes within proximity of the community mobile device 104, the lost tracking device manager 404 may generate and transmit a response to the location request to the tracking system 100, which may be provided to the user 103 associated with the lost tracking device 106. Further, generating and transmitting the response to the tracking request may be conditioned on the status of the tracking device 106 being flagged as lost by the mobile device 102 and/or the tracking system 100.

The lost tracking device manager 404 may additionally provide other information to the tracking system 100 in response to receiving the tracking request. For example, in addition to providing a location of the community mobile device 104, the lost tracking device manager may provide a signal strength associated with the location to indicate a level of proximity to the location of the community mobile device 104 provided to the user 103. For example, if the signal strength is high, the location provided to the user 103 is likely to be more accurate than a location accompanied by low signal strength. This may provide additional information that the user 103 may find useful in determining the precise location of tracking device 106.

As described above, the lost tracking device manager 404 may determine whether to send a location within the proximity of the tracking device 106 to the tracking system 100. The determination of whether to send a location to the tracking system 100 may be based on a variety of factors. For example, a lost tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within the proximity of the tracking device 106.

Leash Trigger Activation

Figure 5:
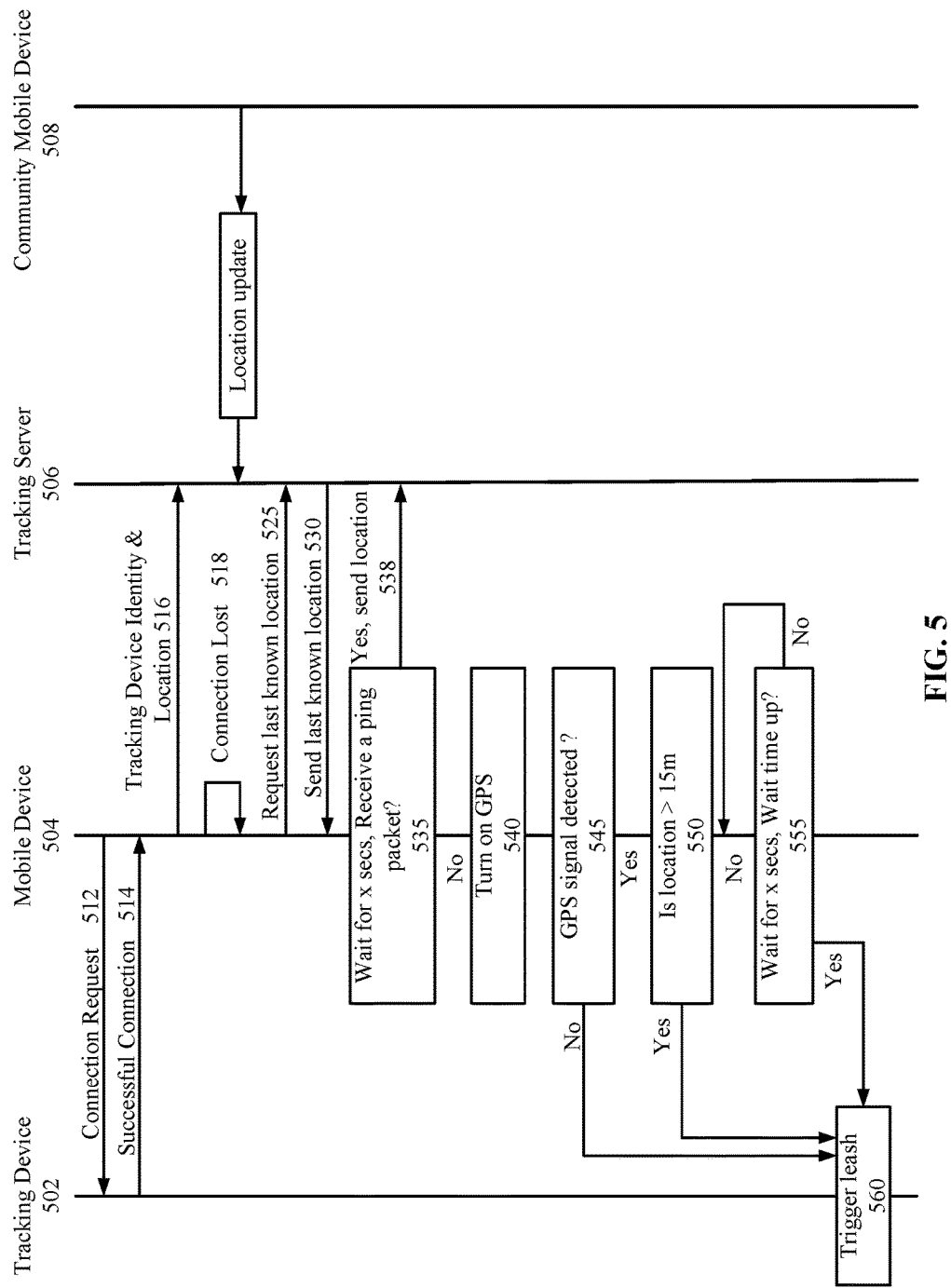
FIG. 5 illustrates a process of triggering a leash on a tracking device, according to one embodiment.

FIG. 5 illustrates a process of triggering a leash on a tracking device, according to one embodiment. A mobile device 504 initiates a connection request 512 to identify a tracking device 502 using one-way communications, for instance using the Bluetooth protocol (communications from the tracking device to the mobile device 504), without requiring communications from the mobile device to the tracking device 502. Such communications are referred to as "advertisements" by the tracking device 502. The advertisements may include one or more tracking device parameters, such as an identifier that uniquely identifies the tracking device, a timestamp corresponding to the advertisement, or any other suitable parameters. The tracking device 502 can broadcast advertisements periodically, after the passage of a pre-determined interval of time, in response to detected movement of the tracking device, or in response to any other suitable stimulus. It should be noted that in some embodiments, an explicit connection is not established between the tracking device 502 and the mobile device 504, and instead, the mobile device receives advertisements broadcast by the tracking device without establishing an explicit connection with the tracking device.

The advertisement packets are resolved by the mobile device 504 to identify the tracking device 502, the mobile device 504 identifies a location of the mobile device (for instance, using GPS or other location detection functionality), and the tracking device identity 516 and identified location are provided to the tracking server 506. In addition to the tracking device identity and location, a timestamp and/or a proximity of the tracking device 502 to the mobile device 504 (which may be calculated based on the signal strength) can be provided to the tracking server 506. The tracking server 506 stores the received tracking device identity and the associated location, timestamp, and proximity to the mobile device 504.

The tracking server 506 may store multiple locations associated with the tracking device 502, for instance from both the mobile device 504 and one or more other mobile devices (such as the community mobile device 508), each location associated with a timestamp. The location with the most recent timestamp is tagged as the last known location of the tracking device 504.

In another embodiment, the tracking server 506 may send a last known location update request 525 to the community of mobile devices 508. A community mobile device 508 may be in proximity to the tracking device 502 and can respond to the tracking request sent by the tracking server 506 with a location identified by the mobile device. In such embodiments, if a leash flag is set for the tracking device 502 (for instance, in response to the activation of a leash for the tracking device by the mobile device 504), the tracking server 506 sends the updated location 530 to the mobile device. The mobile device 504 can de-activate the leash for the tracking device 502 in response (and/or in response to an input from a user confirming the de-activation of the leash), and informs the tracking server that the leash is de-activated. The tracking server 506 de-activates the leash flag corresponding to the mobile device 504 and the tracking device 502.

In some cases, the mobile device 504 may not receive advertisements packets from the tracking device 502 due a loss of connection 518 between the tracking device and the mobile device. The loss of connection can be due to various reasons, for instance the tracking device 502 being out of range of the mobile device 504. Detecting a loss of connection 518 by the mobile device 504 as soon as the tracking device 502 is out of range of the mobile device helps prevent the loss of the tracking device 502. Although out of range, the tracking device 502 may within a threshold distance of the range of the tracking device 502 from the mobile device, for example, on different floors of the same house. In such embodiments, although the mobile device 504 is outside of the range of the tracking device 502, a leash alert is not immediately triggered in order to avoid false positive alerts. To avoid such false positives, the mobile device 504 follows a leash activation algorithm that governs the triggering of an alert for a lost connection of the tracking device 502.

Upon detecting a lost connection 518 with the tracking device 502 (e.g., failing to detect a signal from the tracking device for an predetermined interval of time), the mobile device 504 requests the tracking server to retrieve a last known location 525 of the tracking device 502 from the tracking server. The mobile device 504 further requests the tracking server 506 to mark the tracking device 502 as leashed. In response, the tracking server 506 sets a flag indicating a leash is activated between the tracking device 502 and the mobile device 504. In some embodiments, in response to receiving a request for a last known location from a mobile device 504 associated with a tracking device 502, the tracking server 506 can flag the tracking device as leashed to the mobile device.

The tracking server 506 retrieves the last known location of the tracking device 502 and sends it to the mobile device 504. The mobile device 504 waits 535 for a predetermined time interval (e.g. 1 minute) to receive an advertisement from the tracking device 502. The predetermined time interval can configurable (e.g. can be 30 seconds, 1 minute, 2 minutes, etc.) via the settings of an application running on the mobile device. If the mobile device 504 receives an advertisement while waiting during the predetermined time interval, the leash is de-activated. In response, the mobile device 504 identifies a location of the mobile device, and sends 538 the location along with the identity of the tracking device 502 (determined from the received advertisement) to the tracking server 506 for storage.

If the predetermined time interval elapses without the receiving of an advertisement from the tracking device 502 by the mobile device 504, the mobile device 504 activates 540 location detection functionality (e.g., GPS services). If the mobile device does not detect a GPS signal after turning on GPS services 545, a leash is triggered 560. If a GPS signal is detected, the current location of the mobile device 504 is determined. The current location of the mobile device 504 is compared to the last known location of the tracking device 502. If the current location of the mobile device 504 is a predetermined threshold distance (e.g., 15 meters) away 550 from the tracking device 502, the leash is triggered 560. The predetermined threshold distance is configurable (e.g., 10 meters, 20 meters, 30 meters, etc.) via the settings of an application running on the mobile device. For example, the user can set the predetermined threshold distance such that all locations within a house or office of the user are within the predetermined threshold distance, preventing a false trigger.

If the current location of the mobile device 504 is within the predetermined threshold distance (e.g., 15 meters) from the tracking device 502, the mobile device waits for a predetermined trigger time interval (e.g., 3 minutes, 2 minutes, 30 seconds, etc.) before triggering the leash in order to receive advertisements from the tracking device 502. For example, the user can set the predetermined trigger time to be long enough for them to return by foot to the tracking device 502. If the current location is still within the predetermined threshold distance and the predetermined trigger time interval elapses without receiving advertisements from the tracking device 502, the leash is triggered on the mobile device 504 and tracking device 502.

Once a leash is triggered 560, the tracking device 560 emits a notification, for instance vibrations or an audible alarm. A mobile device user can configure the notification emitted by the tracking device 560 in response to a leash trigger. Additionally, the mobile device 504 emits or displays a notification indicating that the leashed tracking device 502 may be lost. The mobile device user can configure the notification settings for the mobile device 504, for instance via an application running on the mobile device. In embodiments where multiple tracking devices are associated with a mobile device, the mobile device user can configure which tracking device to leash via mobile device. In one embodiment, if the mobile device 504 receives an advertisement packet from the tracking device 502, or an updated location of the tracking device from a community mobile device 508 via the tracking system 506, the leash is de-activated.

Figure 6:
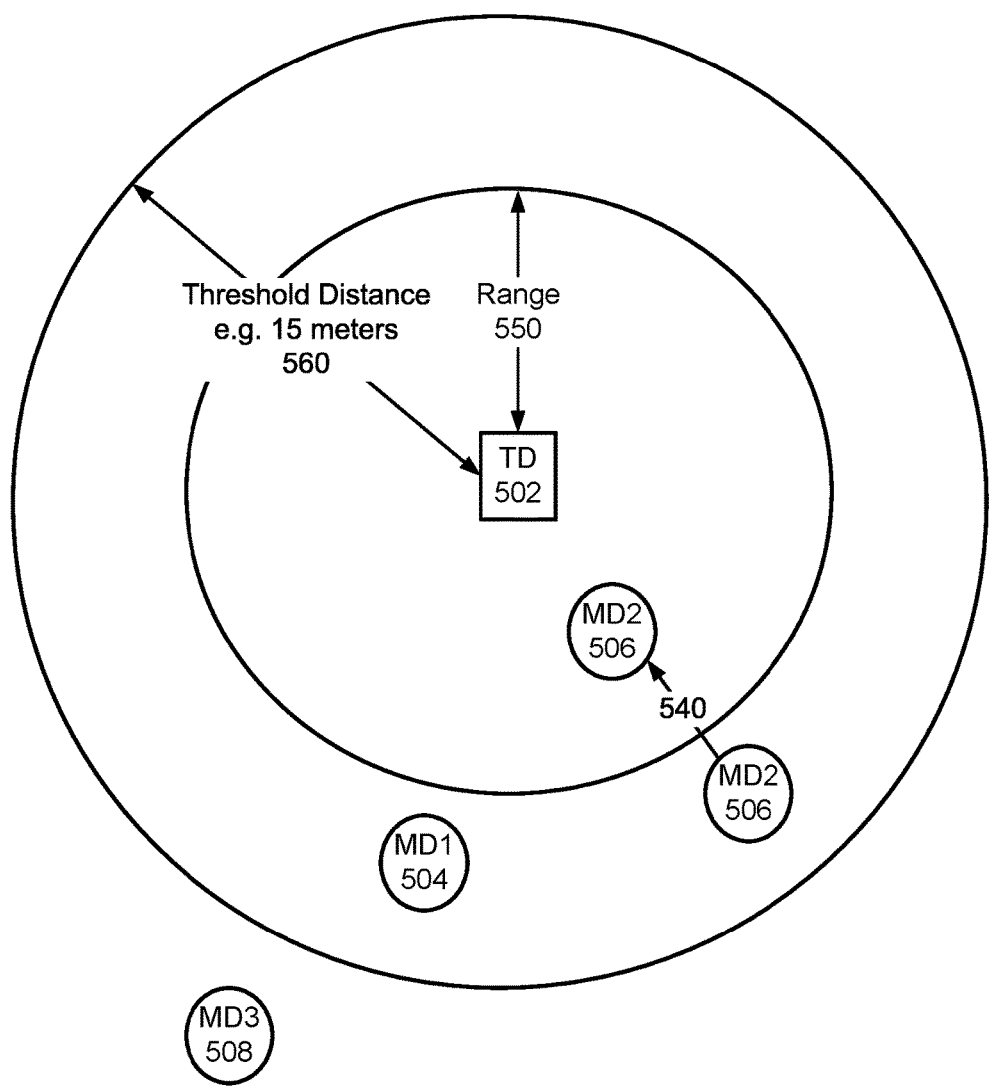
FIG. 6 illustrates an example leash trigger environment that includes a mobile device and leashed tracking device, according to one embodiment.

FIG. 6 illustrates an example leash trigger environment that includes a mobile device and leashed tracking device, according to one embodiment. The figure illustrates two circular areas, one is the range 550 of the tracking device 502 and the other is the predetermined threshold distance 560 for activating leash on the mobile device 504. The leash trigger environment illustrates three example scenarios. In the first scenario, the tracking device 502 is out of range of the mobile device MD1 504. In this scenario, the mobile device MD1 504 detects a lost connection since it is out of the communicative range of the tracking device and a leash is activated on the mobile device MD1 504. In this case, the mobile device MD1 504 waits for the predetermined trigger time (e.g. 3 minutes) to trigger the leash notification. Once the wait time has elapsed, if no communications have been received from the tracking device 502 during the wait time, the leash is triggered on one or both of the mobile device MD1 504 and the tracking device 502.

In the second scenario, a leash is activated on the mobile device MD2 506 when it is out of the communicative range of the tracking device 502. The mobile device MD2 506 moves 540 towards the tracking device 502 such that the mobile device MD2 506 is within the communicative range of the tracking device. After moving, the mobile device MD2 506 starts receiving advertisement packets from the tracking device 502 indicating that the mobile device MD2 506 is now within the range of the tracking device 502. The activated leash on the mobile device MD2 506 is de-activated.

In the third scenario, the mobile device MD3 508 is at distance further than the threshold distance (e.g. 15 meters) from the tracking device 502. A leash is activated on mobile device MD3 508, and because the mobile device is outside the threshold distance from the tracking device 502, a leash is triggered immediately on the mobile device MD3 508 (for instance, without waiting for a threshold wait time interval). The leash triggering includes notifying the user of the mobile device MD3 508 via a push notification, vibration of the mobile device MD3 508 or play a sound on the mobile device MD3.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by a mobile device, a selection of a distance threshold from an owner of a tracking device;
   in response to determining that a distance between the mobile device and a last known location of the tracking device exceeds the selected distance threshold, sending a notification to the owner of the tracking device; and
   in response to determining both that 1) the distance between the mobile device and the last known location of the tracking device never exceeds the selected distance threshold at any point during a period of time for the entirety of the period of time, and that 2) a connection between the mobile device and the tracking device is never established at any point during the entirety of the period of time, sending the notification to the owner of the tracking device after the passage of the period of time.

2. The method of claim 1, wherein a location of the mobile device is determined, and wherein the location of the mobile device comprises geographic coordinates.

3. The method of claim 1, wherein a location of the mobile device is determined by activating a global positioning system (GPS) receiver.

4. The method of claim 1, wherein sending the notification to the owner of the tracking device comprises at least one of displaying a visual indicator, playing an audio indicator, or emitting a vibration indicator on the mobile device.

5. The method of claim 4, wherein sending the notification to the owner of the tracking device further comprises displaying an indication of an identity of the tracking device and an indication that the tracking device is located outside of a communicative range of the mobile device.

6. The method of claim 1, wherein the selected distance threshold is received via an application running on the mobile device.

7. A mobile device comprising:
   a non-transitory computer-readable storage medium storing executable computer instructions for:
      receiving, by the mobile device, a selection of a distance threshold from an owner of a tracking device;
      in response to determining that a distance between the mobile device and a last known location of the tracking device exceeds the selected distance threshold, sending a notification to the owner of the tracking device; and
      in response to determining both that 1) the distance between the mobile device and the last known location of the tracking device never exceeds the selected distance threshold at any point during a period of time for the entirety of the period of time, and that 2) a connection between the mobile device and the tracking device is never established at any point during the entirety of the period of time, sending the notification to the owner of the tracking device after the passage of the period of time; and
   a processor configured to execute the computer instructions.

8. The mobile device of claim 7, wherein a location of the mobile device is determined, and wherein the location of the mobile device comprises geographic coordinates.

9. The mobile device of claim 7, wherein a location of the mobile device is determined by activating a global positioning system (GPS) receiver.

10. The mobile device of claim 7, wherein sending the notification to the owner of the tracking device comprises at least one of displaying a visual indicator, playing an audio indicator, or emitting a vibration indicator on the mobile device.

11. The mobile device of claim 10, wherein sending the notification to the owner of the tracking device further comprises displaying an indication of an identity of the tracking device and an indication that the tracking device is located outside of a communicative range of the mobile device.

12. The mobile device of claim 7, wherein the selected distance threshold is received via an application running on the mobile device.

13. A non-transitory computer-readable storage medium storing executable computer instructions configured to, when executed by a hardware processor, perform steps comprising:
   receiving, by a mobile device, a selection of a distance threshold from an owner of a tracking device;

in response to determining that a distance between the mobile device and a last known location of the tracking device exceeds the selected distance threshold, sending a notification to the owner of the tracking device; and in response to determining both that 1) the distance between the mobile device and the last known location of the tracking device never exceeds the selected distance threshold at any point during a period of time for the entirety of the period of time, and that 2) a connection between the mobile device and the tracking device is never established at any point during the entirety of the period of time, sending the notification to the owner of the tracking device after the passage of the period of time.

14. The non-transitory computer-readable storage medium of claim 13, wherein a location of the mobile device is determined, and wherein the location of the mobile device comprises geographic coordinates.

15. The non-transitory computer-readable storage medium of claim 13, wherein a location of the mobile device is determined by activating a global positioning system (GPS) receiver.

16. The non-transitory computer-readable storage medium of claim 13, wherein sending the notification to the owner of the tracking device comprises at least one of displaying a visual indicator, playing an audio indicator, or emitting a vibration indicator on the mobile device.

17. The non-transitory computer-readable storage medium of claim 16, wherein sending the notification to the owner of the tracking device further comprises displaying an indication of an identity of the tracking device and an indication that the tracking device is located outside of a communicative range of the mobile device.

18. The non-transitory computer-readable storage medium of claim 13, wherein the selected distance threshold is received via an application running on the mobile device.

* * * * *